US012800429B2

(12) United States Patent
Takamine et al.

(10) Patent No.: US 12,800,429 B2
(45) Date of Patent: Nov. 17, 2026

(54) STRUCTURE EVALUATION SYSTEM, STRUCTURE EVALUATION METHOD, AND STRUCTURE EVALUATION APPARATUS

(71) Applicant: KABUSHIKI KAISHA TOSHIBA, Tokyo (JP)

(72) Inventors: Hidefumi Takamine, Tokyo (JP); Takashi Usui, Saitama (JP); Kazuo Watabe, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 321 days.

(21) Appl. No.: 18/587,783

(22) Filed: Feb. 26, 2024

(65) Prior Publication Data

US 2025/0027834 A1 Jan. 23, 2025

(30) Foreign Application Priority Data

Jul. 19, 2023 (JP) ................................. 2023-117567

(51) Int. Cl.
*G01M 5/00* (2006.01)
*G08G 1/01* (2006.01)

(52) U.S. Cl.
CPC ............ *G01M 5/0066* (2013.01); *G01M 5/00* (2013.01); *G01M 5/0033* (2013.01); *G08G 1/0137* (2013.01)

(58) Field of Classification Search
CPC .... G01M 5/00; G01M 5/0066; G01M 5/0033; G08G 1/0137; G01N 2223/614; G01N 2223/616; G01N 29/04; G01N 2203/0019; G01N 2203/0033; G01N 2291/0289
USPC ......... 73/587, 594, 649, 763, 764, 767, 770, 73/772, 786, 799, 801, 866
See application file for complete search history.

(56) References Cited

U.S. PATENT DOCUMENTS

2017/0363586 A1 12/2017 Takamine et al.
2019/0346408 A1 11/2019 Lanza di Scalea
2020/0130240 A1 4/2020 Costanza et al.
2022/0130240 A1 4/2022 Takamine et al.
2022/0155138 A1 5/2022 Tanaka et al.

FOREIGN PATENT DOCUMENTS

JP 2003-132486 A 5/2003
JP 2013-205287 A 10/2013
JP 2022-070711 A 5/2022
JP 2022-146671 A 10/2022
WO WO 2017/217034 A1 12/2017
WO WO 2020/194494 A1 10/2020

OTHER PUBLICATIONS

Office Action issued in Japanese Patent Application No. 2023-117567, dated Aug. 26, 2025 in 10 pages.

*Primary Examiner* — Robert R Raevis
(74) *Attorney, Agent, or Firm* — Knobbe, Martens, Olson & Bear, LLP

(57) ABSTRACT

According to one embodiment, a structure evaluation system according to an embodiment includes a plurality of sensors, a vehicle number estimator, and an evaluator. The plurality of sensors detect elastic waves generated inside a structure. The vehicle number estimator estimates the number of vehicles passing through the structure on the basis of a plurality of elastic waves detected by each of the plurality of sensors. The evaluator evaluates a state of deterioration of the structure using vehicle information relating to the number of vehicles estimated by the vehicle number estimator.

10 Claims, 6 Drawing Sheets

STRUCTURE EVALUATION SYSTEM, STRUCTURE EVALUATION METHOD, AND STRUCTURE EVALUATION APPARATUS

CROSS-REFERENCE TO RELATED APPLICATION

This application is based upon and claims the benefit of priority from Japanese Patent Application No. 2023-117567, filed Jul. 19, 2023, the entire contents of which are incorporated herein by reference.

FIELD

Embodiments described herein relate generally to a structure evaluation system, a structure evaluation method, and a structure evaluation apparatus.

BACKGROUND

By installing a sensor on the surface of a structure such as a bridge, elastic waves generated inside the structure can be detected. Further, by installing a plurality of sensors on the surface of a structure, the position of the generation source of elastic waves (hereinafter referred to as an "elastic wave source") can be located on the basis of the difference in the arrival times of the elastic waves detected by each sensor. Elastic waves are also generated inside a structure when an impact is applied to the surface of the structure from the outside. Even in such a case, the position of the elastic wave source can be located on the basis of the difference in the arrival times of the elastic waves detected by each sensor.

Damage to the propagation path of elastic waves inside a structure interferes with the propagation of the elastic waves. When the propagation of elastic waves is interfered with due to damage inside a structure, some sensors cannot detect the elastic waves. As a result, the accuracy of a location result of the elastic wave source decreases. In a case where elastic waves are detected by sensors installed on opposite sides by applying a spatially uniformly given impact to the surface of a structure such as collision of raindrops with a road surface during rainfall, the density of the elastic wave source is observed to decrease in a region within internal damage. Using such characteristics, the state of deterioration of a structure (presence or absence of damage inside a structure) can be evaluated. In particular, damage inside a structure can be detected using elastic waves generated by a vehicle traveling on a road surface.

However, in a case where the evaluation using the above method is performed, it is necessary to locate the position of the elastic wave source. Due to the calculation of the position location, the processing load increases as the amount of measurement data increases. In addition, since a method of calculating a position location is not uniquely determined, the results may vary depending on the calculation conditions and the like. Consequently, there is a need for an evaluation method that makes it possible to evaluate the state of deterioration of a structure without locating the position of the elastic wave source.

DETAILED DESCRIPTION

The present invention provides problem to be solved by the present invention is to provide a structure evaluation system, a structure evaluation method, and a structure evaluation apparatus that make it possible to evaluate the state of deterioration of a structure without locating the position of an elastic wave source.

According to one embodiment, a structure evaluation system according to an embodiment includes a plurality of sensors, a vehicle number estimator, and an evaluator. The plurality of sensors detect elastic waves generated inside a structure. The vehicle number estimator estimates the number of vehicles passing through the structure on the basis of a plurality of elastic waves detected by each of the plurality of sensors. The evaluator evaluates a state of deterioration of the structure using vehicle information relating to the number of vehicles estimated by the vehicle number estimator.

Hereinafter, a structure evaluation system, a structure evaluation method, and a structure evaluation apparatus according to an embodiment will be described with reference to the accompanying drawings.

First Embodiment

Figure 1:
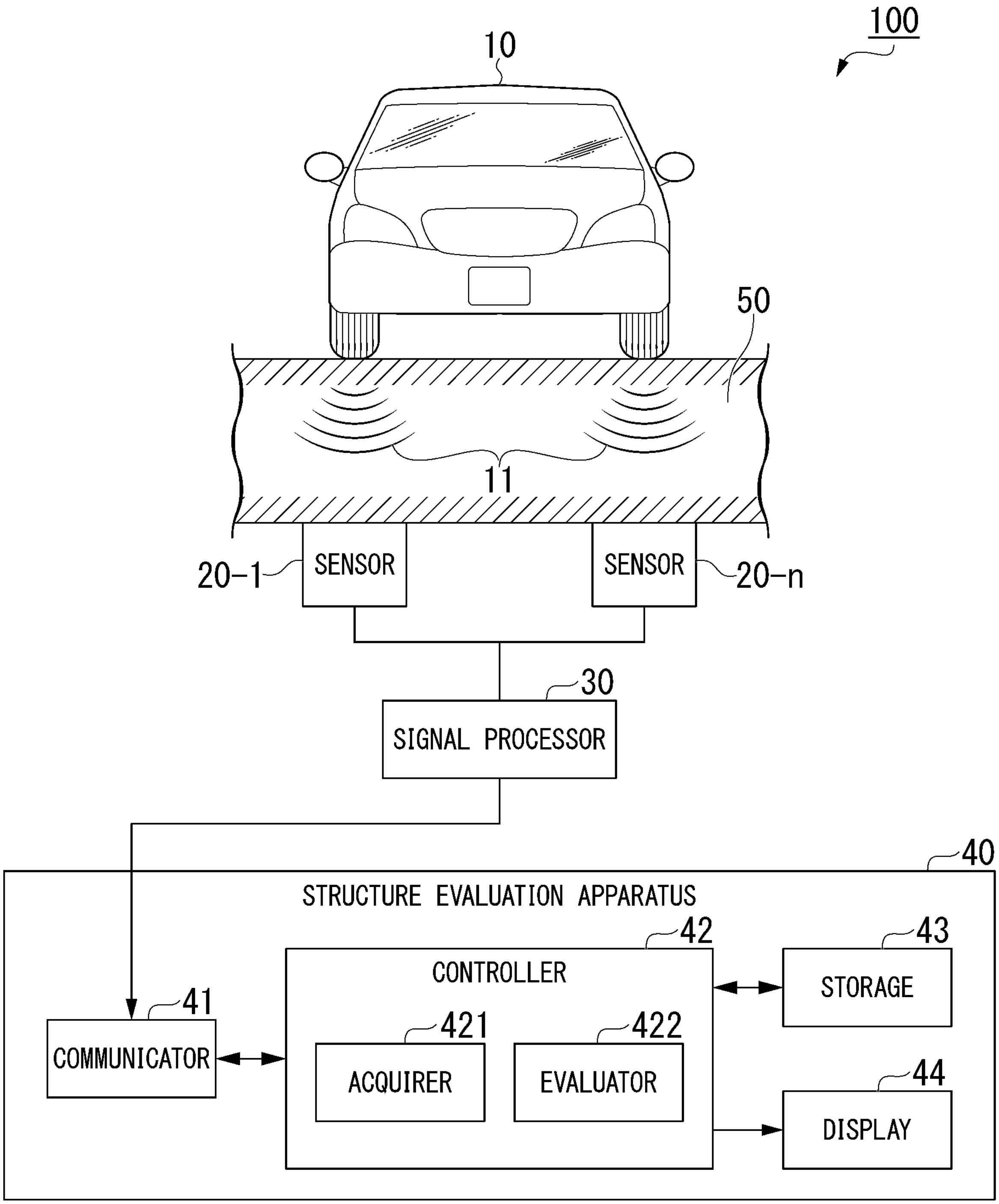
FIG. 1 is a diagram illustrating a configuration of a structure evaluation system according to a first embodiment.

FIG. 1 is a diagram illustrating a configuration of a structure evaluation system 100 according to a first embodiment. The structure evaluation system 100 is used to evaluate the soundness of a structure 50. In the following description, evaluation means determining the degree of soundness of the structure 50, that is, the state of deterioration of the structure 50 on the basis of a certain standard.

In the following description, a case where the structure 50 is a bridge will be described as an example, but the structure 50 does not need to be limited to a bridge. The structure 50 may be any structure insofar as it generates elastic waves 11 due to the occurrence of propagation of cracks or external impact (such as, for example rain or artificial rain). Meanwhile, bridges are not limited to structures built over rivers, valleys, or the like, and also include various structures provided above the ground (for example, expressway viaducts), and the like.

Examples of damage that influences the evaluation of the state of deterioration of the structure 50 include damage inside the structure that interferes with the propagation of the elastic waves 11 such as cracks, cavities, and sedimentation. Here, the cracks include longitudinal cracks, transverse cracks, diagonal cracks, and the like. A longitudinal crack is a crack that occurs in a direction perpendicular to the road surface. A transverse crack is a crack that occurs in a direction horizontal to the road surface. A diagonal crack is a crack that occurs in a direction that is not horizontal or perpendicular to the road surface. Sedimentation is a deterioration in which concrete turns into earth and sand mainly at the boundary between asphalt and concrete slabs.

The structure evaluation system 100 includes a plurality of sensors 20-1 to **20-*n* (n is an integer equal to or greater than 2), a signal processor 30, and a structure evaluation apparatus 40. Each of the plurality of sensors 20-1 to 20-*n* and the signal processor 30 are communicably connected to each other in a wired manner. The signal processor 30 and the structure evaluation apparatus 40 are communicably connected to each other in a wired or wireless manner. Meanwhile, in the following description, the sensors 20-1 to 20-*n* will be referred to as the sensor 20** in a case where they need not be distinguished from each other.

As shown in FIG. 1, when a vehicle 10 passes over the structure 50, a load is applied to the road surface due to contact between the traveling parts (for example, tires) of the vehicle 10 and the road surface. A large number of elastic waves 11 are generated inside the structure 50 due to deflection and strain caused by the load, interaction between the traveling parts and the pavement, or the like. Each sensor 20 installed on the lower surface of the structure 50 can detect the elastic waves 11 generated inside the structure 50.

The sensor 20 has a piezoelectric element and detects the elastic waves 11 generated from the interior of the structure 50. The sensor 20 is installed at a position on the surface of the structure 50 where the elastic waves 11 can be detected. For example, the sensors 20-1 to **20-*n* are installed on any of the road surface, side surface, and bottom surface at the same or different intervals in the direction of the vehicle travel axis and in the direction orthogonal to the vehicle travel axis. The direction of the vehicle travel axis is a direction in which the vehicle travels on the road surface. The direction orthogonal to the vehicle travel axis is a direction perpendicular to the direction of the vehicle travel axis. The sensor 20 converts the detected elastic waves 11 into an electrical signal. In the following description, a case where the sensor 20 is installed on bottom surface of the structure 50** will be used as example.

For example, a piezoelectric element having sensitivity in the range of 10 kHz to 1 MHz is used for the sensor 20. The sensor 20 may be of any type such as a resonant type having a resonance peak within a frequency range or a broadband type with suppressed resonance, and any type of sensor 20 may be used. Methods by which the sensor 20 detects the elastic waves 11 include a voltage output type, a resistance change type, a capacitance type, or the like, and any of these detection methods may be used.

An acceleration sensor may be used instead of the sensor 20. In this case, the acceleration sensor detects the elastic waves 11 which are generated inside the structure 50. The acceleration sensor then converts the detected elastic waves 11 into an electrical signal by performing the same processing as the sensor 20.

The signal processor 30 receives the electrical signal output from the sensor 20 as an input. The signal processor 30 performs signal processing on the input electrical signal. Examples of the signal processing performed by the signal processor 30 include noise removal, extraction of the feature values of elastic waves, and the like. The signal processor 30 generates transmission data including a digital signal after signal processing. The signal processor 30 outputs the generated transmission data to the structure evaluation apparatus 40.

The signal processor 30 is configured using an analog circuit or a digital circuit. Meanwhile, in a case where the signal processor 30 is configured with an analog circuit, an analog-digital converter may not be provided between the sensor 20 and the signal processor 30. That is, in a case where the signal processor 30 is configured with an analog circuit, an electrical signal from which noise has been removed by a filter is input to the signal processor 30. The digital circuit is realized by, for example, a field programmable gate array (FPGA) or a microcomputer. The digital circuit may be realized by a dedicated large-scale integration (LSI). In addition, the signal processor 30 may be equipped with a nonvolatile memory such as a flash memory, or a removable memory. A case where the signal processor 30 is configured using a digital circuit will be described below.

Figure 2:
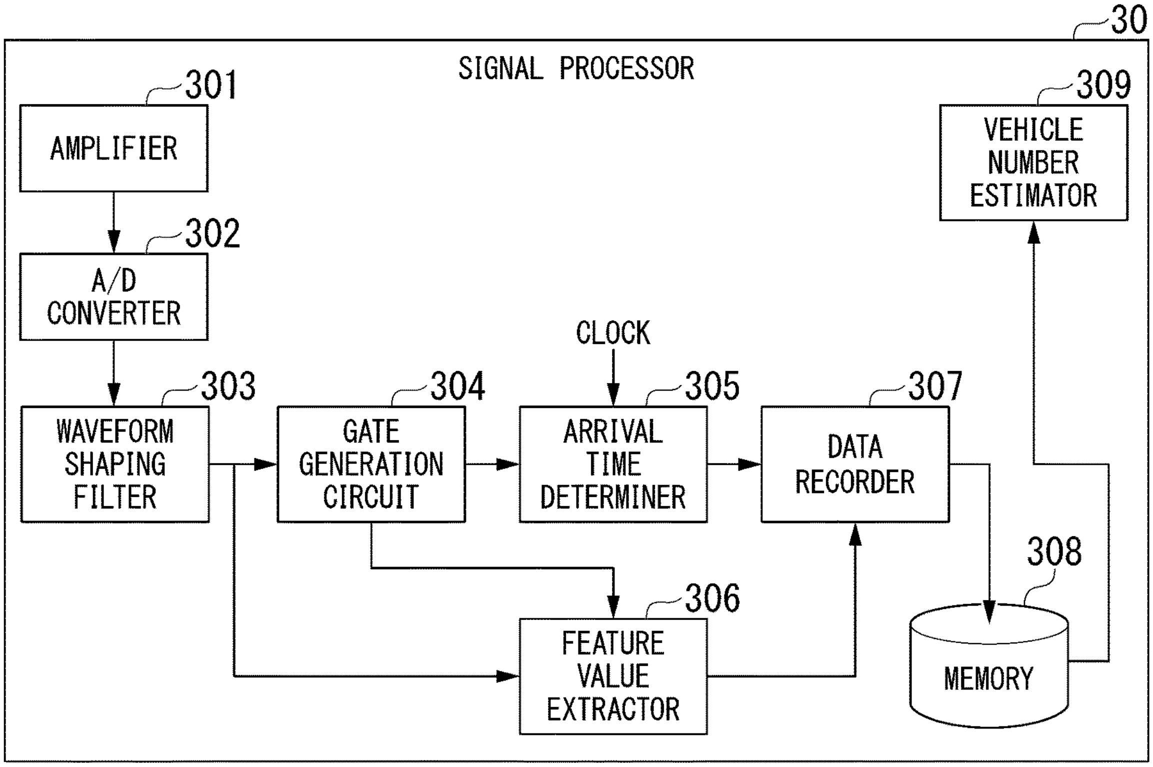
FIG. 2 is a diagram illustrating a configuration example of a signal processor according to the first embodiment.

FIG. 2 is a diagram illustrating a configuration example of the signal processor 30 according to the first embodiment. The signal processor 30 includes an amplifier 301, an A/D converter 302, a waveform shaping filter 303, a gate generation circuit 304, an arrival time determiner 305, a feature value extractor 306, a data recorder 307, a memory 308, and a vehicle number estimator 309.

The amplifier 301 amplifies the electrical signal output from the sensor 20 and outputs the amplified electrical signal to the A/D converter 302. The amplifier 301 amplifies, for example, an electrical signal by a predetermined amount (for example, by a factor of 10 to 100).

The A/D converter 302 quantizes the amplified electrical signal and converts it into a digital signal. The A/D converter 302 outputs a digital signal to the waveform shaping filter 303.

The waveform shaping filter 303 removes noise components outside a predetermined bandwidth from the input digital signal. The waveform shaping filter 303 is, for example, a digital band pass filter (BPF). The waveform shaping filter 303 outputs a digital signal after noise component removal (hereinafter referred to as a "noise removal signal") to the gate generation circuit 304 and the feature value extractor 306.

The gate generation circuit 304 receives the noise removal signal output from the waveform shaping filter 303 as an input. The gate generation circuit 304 generates a gate signal on the basis of the input noise removal signal. The gate signal is a signal indicating whether the waveform of the noise removal signal is sustained.

The gate generation circuit 304 is realized by, for example, an envelope detector and a comparator. The envelope detector detects the envelope of the noise removal signal. The envelope is extracted, for example, by squaring the noise removal signal and performing predetermined processing (for example, processing using a low-pass filter or Hilbert transform) on the squared output value. The comparator determines whether the envelope of the noise removal signal is equal to or greater than a predetermined threshold.

In a case where the envelope of the noise removal signal is equal to or greater than the predetermined threshold, the gate generation circuit 304 outputs a first gate signal indicating that the waveform of the noise removal signal is sustained to the arrival time determiner 305 and the feature value extractor 306. On the other hand, in a case where the envelope of the noise removal signal is less than the predetermined threshold, the gate generation circuit 304 outputs a second gate signal indicating that the waveform of the noise removal signal is not sustained to the arrival time determiner 305 and the feature value extractor 306. Meanwhile, although a configuration in which the gate generation circuit 304 determines whether the waveform of the noise removal signal is sustained on the basis of the envelope is shown, the gate generation circuit 304 may process the noise removal signal itself or a signal to which an absolute value is applied. The threshold used for this gate generation is referred to as a measurement threshold.

The arrival time determiner 305 receives, as inputs, a clock which is output from a clock source such as a crystal oscillator (not shown) and a gate signal which is output from the gate generation circuit 304. The arrival time determiner 305 determines an elastic wave arrival time using the clock input while the first gate signal is being input. The arrival time determiner 305 outputs the determined elastic wave arrival time as time information to the data recorder 307. The arrival time determiner 305 does not perform any processing while the second gate signal is being input. The arrival time determiner 305 generates cumulative time information since power-on on the basis of the signal from the clock source. Specifically, the arrival time determiner 305 need only be a counter that counts the edges of the clock, and use the value of the register of the counter as time information. The register of the counter is determined to have a predetermined bit length.

The feature value extractor 306 receives, as inputs, the noise removal signal output from the waveform shaping filter 303 and the gate signal output from the gate generation circuit 304. The feature value extractor 306 uses the noise removal signal input while the first gate signal is input to extract feature values of the noise removal signal. The feature value extractor 306 does not perform any processing while the second gate signal is being input. Feature values are information indicating the features of the noise removal signal. The feature values of the noise removal signal are the feature values of elastic waves detected using the sensors 20.

The feature values include, for example, a waveform amplitude [mV], a waveform rise time [usec], gate signal sustain duration [usec], a zero cross count number [times], a waveform energy [arb.], frequency [Hz], root mean square (RMS) value, and the like. The feature value extractor 306 outputs parameters concerning the extracted feature values to the data recorder 307. The feature value extractor 306 associates the parameters related to the feature values with a sensor ID when the parameters related to the feature values are output. The sensor ID indicates identification information for identifying the sensor 20 installed in a region which is a target for evaluation of the soundness of the structure 50 (hereinafter referred to as an "evaluation region"). This makes it possible to distinguish which of the parameters related to the feature values are the feature values of the elastic waves detected by which of the sensors 20.

The amplitude of the waveform is, for example, the value of the maximum amplitude in the noise removal signal. The rise time of the waveform is, for example, a time T1 which will be taken for the noise removal signal to reach the maximum value after the start of rise of the gate. The duration of the gate signal is, for example, a time which will be taken for the amplitude to become smaller than a value set in advance after the start of rise of the gate signal. The number of zero-cross counts is, for example, the number of times the noise removal signal crosses a reference line passing through a zero value.

The energy of the waveform is, for example, a value obtained by time-integrating the square of the amplitude of the noise removal signal at each point in time. Meanwhile, the definition of energy is not limited to the above example, and may be approximated using, for example, the envelope of the waveform. The frequency is the frequency of the noise removal signal. The RMS value is, for example, a value obtained by squaring the amplitude of the noise removal signal at each point in time and using the square root.

The data recorder 307 receives, as inputs, the sensor ID, the time information, and the parameters related to the feature values. The data recorder 307 records elastic wave data including the input sensor ID, time information, and parameters related to the feature values in the memory 308. For example, the data recorder 307 may record the elastic wave data in the memory 308 in the order of acquisition, or may record the elastic wave data in the memory 308 in a time series order on the basis of the time information.

The memory 308 stores one or more pieces of elastic wave data. The memory 308 is, for example, a dual port random access memory (RAM). One piece of elastic wave data is data obtained from one elastic wave.

The vehicle number estimator 309 estimates the number of passing vehicles using one or more pieces of elastic wave data stored in the memory 308. More specifically, the vehicle number estimator 309 extracts the feature values of elastic waves included in each of one or more pieces of elastic wave data. The vehicle number estimator 309 calculates a time-series transition of the extracted feature values of each elastic wave. The time-series transition of the feature values indicates the transition of the feature values of each elastic wave in a period from input of the first gate signal to input of the second gate signal. The time-series transition of the feature values becomes a mountain shape in which the feature values reaches a peak at a timing when the traveling parts of the vehicle 10 passes close to the sensor 20. Two peaks of front and rear wheels may be observed depending on conditions such as the type of vehicle 10 and the traffic position. The vehicle number estimator 309 estimates the number of passing vehicles on the basis of the calculated time-series transition of the feature values.

Further, the vehicle number estimator 309 calculates the number of sensors 20 that have detected elastic waves generated by the passage of the same vehicle (hereinafter referred to as "the number of simultaneous sensor hits"). In a case where the structure 50 is sound, all the sensors 20 can detect elastic waves generated by the passage of the vehicle. Therefore, the number of simultaneous sensor hits is assumed to be the number of all sensors 20 installed in the structure 50. On the other hand, in a case where some damage occurs inside the structure 50, the propagation of elastic waves is interfered with due to the damage. Therefore, the sensor 20 installed near a region where damage has occurred may not be able to detect the elastic waves. This means that, as damage inside the structure 50 becomes severer, the number of sensors 20 that cannot detect elastic waves increases. In this way, the number of simultaneous sensor hits serves as an index for evaluating the state of deterioration of the structure 50.

The vehicle number estimator 309 transmits information on the estimated number of passing vehicles (hereinafter referred to as "the estimated number of vehicles") and information on the number of simultaneous sensor hits obtained for each passing vehicle as vehicle information to the structure evaluation apparatus 40. The vehicle number estimator 309 may transmit the vehicle information for a period to be evaluated (hereinafter referred to as an "evaluation target period") collectively to the structure evaluation apparatus 40, or may transmit it to the structure evaluation apparatus 40 every time the vehicle information is obtained or every time a predetermined number of pieces of vehicle information are obtained.

Referring back to FIG. 1, description will be continued. The structure evaluation apparatus 40 includes a communicator 41, a controller 42, a storage 43, and a display 44.

The communicator 41 receives one or more pieces of vehicle information transmitted from the signal processor 30.

The controller 42 controls the entire structure evaluation apparatus 40. The controller 42 is configured using a processor such as a central processing unit (CPU) and a memory. The controller 42 functions as an acquirer 421 and an evaluator 422 by executing a program.

Some or all of the functional units of the acquirer 421 and the evaluator 422 may be realized by hardware such as an application specific integrated circuit (ASIC), a programmable logic device (PLD), or an FPGA, or may be realized by software and hardware in cooperation. The program may be recorded on a computer-readable recording medium. The computer-readable recording medium is, for example, a flexible disk, a magneto-optic disc, a read only memory (ROM), a portable medium such as a CD-ROM, or a non-transitory storage medium such as a storage device such as a hard disk built into a computer system. The program may be transmitted through an electric communication line.

Some of the functions of the acquirer 421 and the evaluator 422 do not need to be installed in the structure evaluation apparatus 40 in advance, and may be realized by an additional application program being installed in the structure evaluation apparatus 40.

The acquirer 421 acquires various types of information. For example, the acquirer 421 acquires vehicle information received by the communicator 41. Meanwhile, the acquirer 421 acquires the vehicle information for the evaluation target period. The acquirer 421 stores the acquired vehicle information in the storage 43.

The evaluator 422 evaluates the state of deterioration of the structure 50 on the basis of the vehicle information acquired by the acquirer 421. For example, the evaluator 422 evaluates the state of deterioration of the structure 50 on the basis of the shape of the distribution or the peak position of the distribution obtained on the basis of the vehicle information. Here, the distribution obtained on the basis of the vehicle information is a histogram with the horizontal axis as the number of simultaneous hit sensors and the vertical axis as the estimated number of vehicles. A specific evaluation method performed by the evaluator 422 will be described later.

The storage 43 stores the vehicle information for the evaluation target period acquired by the acquirer 421 and the reference information. The reference information is information referred to by the evaluator 422 in order to perform evaluation. For example, the reference information includes information relating to the shape of the distribution or the peak position of the distribution to be considered as sound, and information relating to the shape of the distribution or the peak position of the distribution to be considered to have deteriorated. The storage 43 is configured using a storage device such as a magnetic hard disk device or a semiconductor storage device.

The display 44 displays the evaluation result in accordance with control of the evaluator 422. For example, the display 44 may display whether deterioration has occurred inside the structure 50 as the evaluation result. The display 44 is an image display device such as a liquid crystal display or an organic electro luminescence (EL) display. The display 44 may be an interface for connecting an image display device to the structure evaluation apparatus 40. In this case, the display 44 generates a video signal for displaying the evaluation result, and outputs the video signal to the image display device connected to itself.

Figure 3:
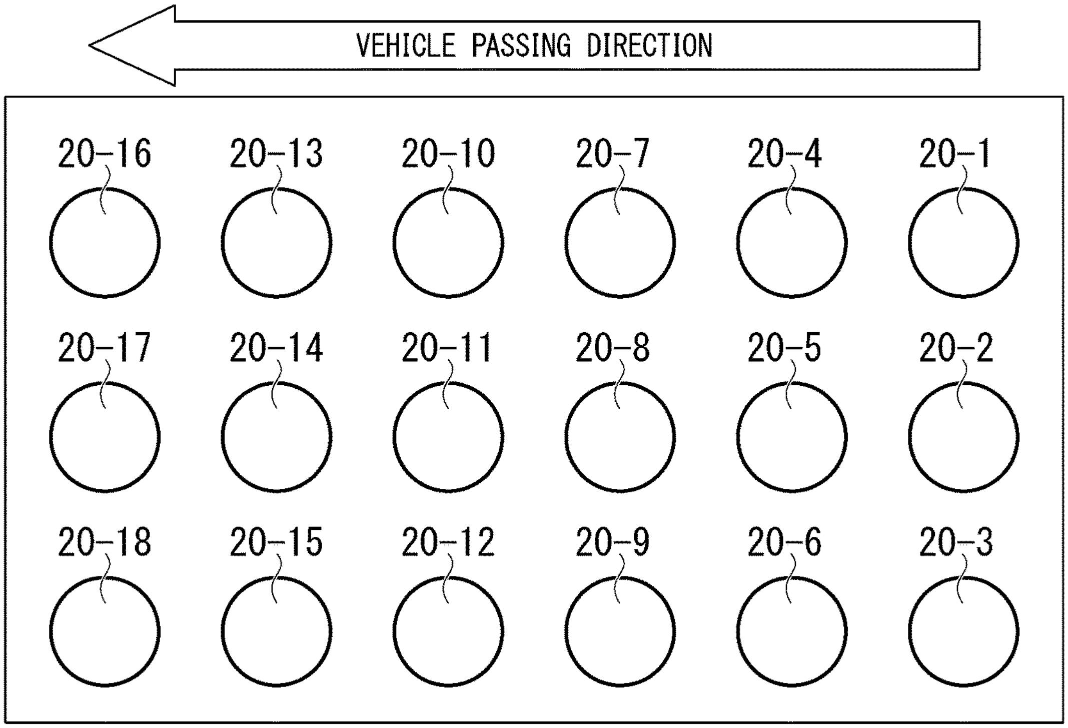
FIG. 3 is a diagram illustrating an example of arrangement of a plurality of sensors according to the first embodiment.

FIG. 3 is a diagram illustrating an example of arrangement of a plurality of sensors 20 according to the first embodiment. FIG. 3 shows an example in which eighteen sensors 20-1 to 20-18 are arranged in a lattice shape of 3×6 rows. Here, the sensors 20 are numbered from 1 to 18 channels in order from the right side of FIG. 3. The vehicle 10 enters the structure from the right side of FIG. 3 and exits from the left side. Therefore, the elastic waves generated by the passage of the vehicle 10 are usually first detected by the sensors 20-1 to 20-3 disposed at the right end of FIG. 3, gradually detected by the sensors 20 on the left side, and finally detected by the sensors 20-16 to 20-18 disposed at the left end.

Figure 4:
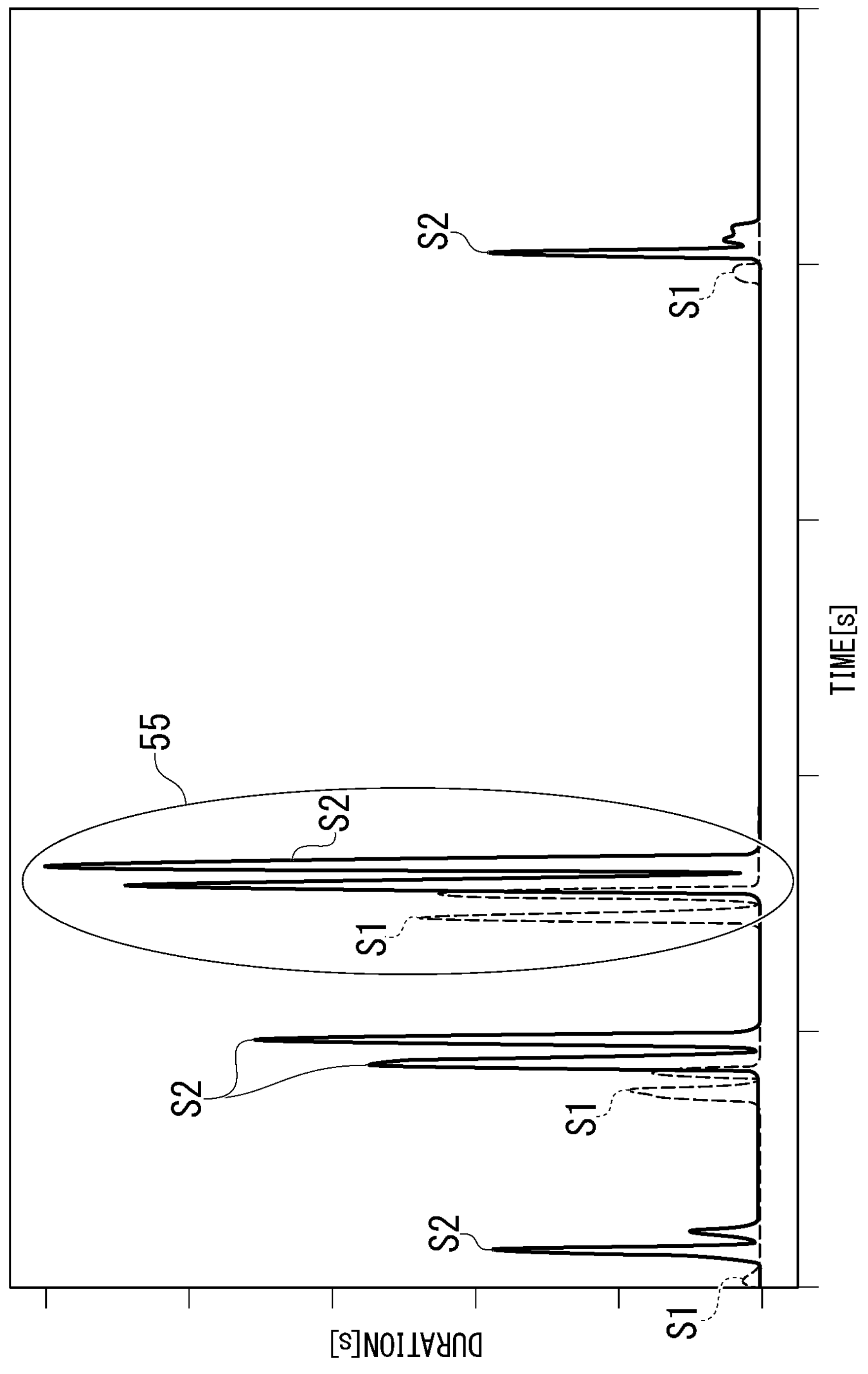
FIG. 4 is a diagram illustrating a process of estimating the number of passing vehicles according to the first embodiment.

FIG. 4 is a diagram illustrating a process of estimating the number of passing vehicles according to the first embodiment. The example shown in FIG. 4 shows an excerpt of the time-series transition of the feature values based on the elastic waves detected by the 2-channel sensor 20-2 disposed at the center of the right end and the 17-channel sensor 20-17 disposed at the center of the left end among the eighteen sensors 20 shown in FIG. 3. In FIG. 4, the horizontal axis indicates time t, and the vertical axis indicates the integrated value of the duration of the elastic waves detected per hour. Meanwhile, the feature values used here does not necessarily have to be the integrated duration, and other feature values such as energy and amplitude can be used as well.

The line segment S1 shown in FIG. 4 represents the time-series transition of the feature values based on the elastic waves detected by the sensor 20-2, and the line segment S2 represents the time-series transition of the feature values based on the elastic waves detected by the sensor 20-17. Since the vehicle 10 passes over the structure 50 at predetermined intervals, the time-series transition of a plurality of feature values appears in accordance with the number of passing vehicles as shown in FIG. 4. As shown by a circle 55, the mountain-shaped waveform representing the time-series transition of the feature values are first observed by the sensor 20-2 on the side where the vehicle 10 enters, and is observed slightly later by the sensor 20-17 on the side where the vehicle 10 exits. Based on the arrangement interval of the sensors 20, the wheelbase of the vehicle 10, and the traffic speed of the vehicle 10, it is possible to calculate the time lag when the same vehicle is observed by each sensor 20, and to specify the same vehicle from a series of detected signals.

In the example shown in FIG. 4, the vehicle number estimator 309 estimates that four vehicles 10 have passed. Meanwhile, two line segments S1 indicating the time-series transition of the feature values based on the elastic waves detected by the sensor 20-2 are shown within the circle 55. This is caused by the elastic waves generated by each of the front wheels and the reel wheels of the vehicle 10 as described above. In FIG. 4, only the sensor 20-2 and the sensor 20-17 are excerpted, but originally, the time-series transition of the feature values will be shown for the number of sensors 20 that have detected elastic waves. Consequently, the vehicle number estimator 309 estimates the number of simultaneous hit sensors on the basis of the time-series transition of the feature values. For example, the vehicle number estimator 309 counts the number of sensors 20 that have detected the vehicle 10 in the time-series transition of the feature values within the circle 55. The vehicle number estimator 309 estimates the counted number as the number of simultaneous hit sensors. As shown in FIG. 3, in a case where eighteen sensors 20 are installed, the maximum value of the number of simultaneous hit sensors is 18.

Next, a specific evaluation method performed by the evaluator 422 will be described with reference to FIGS. 5A, 5B, and 5C. The evaluator 422 generates a histogram with the horizontal axis as the number of simultaneous hit sensors and the vertical axis as the estimated number of vehicles (hereinafter referred to as a "simultaneous hit histogram") on the basis of the vehicle information obtained from the signal processor 30. The simultaneous hit histogram is an aggregation of the estimated number of vehicles for each number of simultaneous hit sensors. The number of simultaneous hit sensors also varies due to variations in the type of vehicle, the vehicle passing position, or the like, and the simultaneous hit histogram has a characteristic distribution.

Figure 5A:
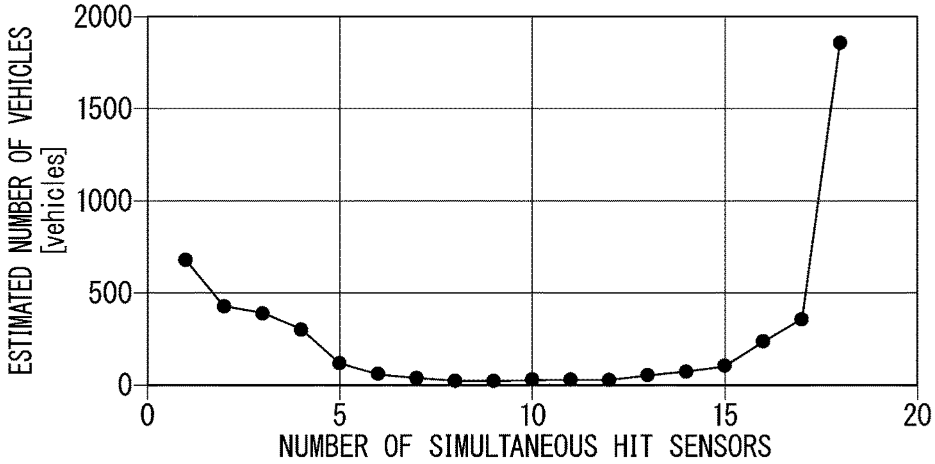
FIG. 5A is a diagram illustrating a histogram which is obtained on the basis of a sound structure.
Figure 5B:
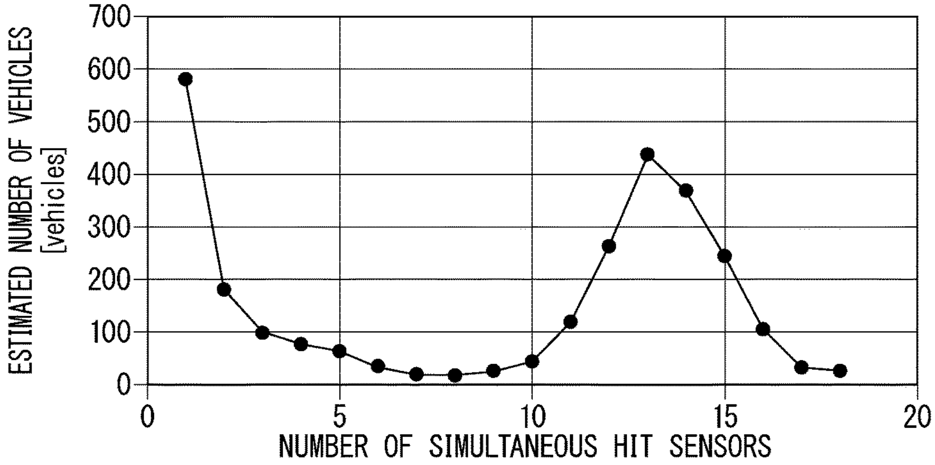
FIG. 5B is a diagram illustrating a histogram which is obtained on the basis of a structure that has deteriorated to some extent.
Figure 5C:
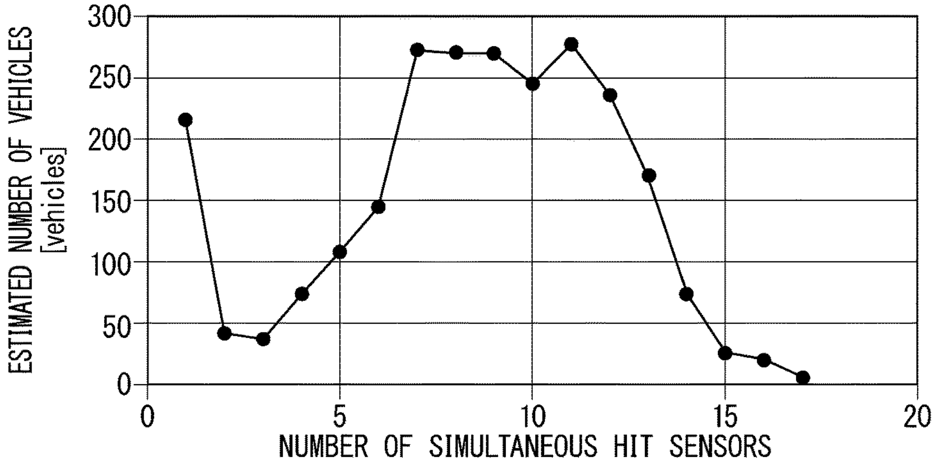
FIG. 5C is a diagram illustrating a histogram which is obtained on the basis of a structure that has deteriorated to some extent.

FIG. 5A represents a histogram obtained on the basis of a sound structure 50, and FIGS. 5B and 5C represent histograms obtained on the basis of the structure 50 that has deteriorated to some extent. The sound structure 50 shown in FIG. 5A has peaks at positions where the number of simultaneous hit sensors is "1" and "18" and exhibits a bathtub-like shape. In the sound structure 50, elastic waves have a tendency to propagate and have a tendency to reach the sensor 20. Therefore, it is considered that almost all the sensors 20 often detect elastic waves caused by passing vehicles. It is presumed that the peak on the side where the number of hit sensors is "1" is due to the detection of mixing of elastic waves caused by the vehicle 10 passing through a location far from the measurement target region, other noise, or the like.

On the other hand, in the structure 50 that has deteriorated to some extent as shown in FIGS. 5B and 5C, the propagation of elastic waves interfered with due to damage or the like, and thus the number of sensors 20 that cannot sufficiently detect the vehicle 10 increases. For this reason, the number of vehicles in which the number of simultaneous hit sensors is "18" decreases significantly, and the peak of the histogram shifts to the side where the number of simultaneous hit sensors is small. Therefore, the evaluator 422 can generate a histogram on the basis of the vehicle information obtained from the signal processor 30, and simply evaluate the state of deterioration of the structure 50 on the basis of the shape of the generated histogram or the peak position in the histogram.

Meanwhile, reference information in which the shape of the histogram shown in FIGS. 5A to 5C or information on the peak position in the histogram is associated with the evaluation result (soundness or deterioration) may be stored in the storage 43, and the evaluation may be performed by comparing the shape of the histogram generated by the evaluator 422 or the peak position in the histogram with the reference information. In this case, the evaluator 422 may determine the evaluation result associated with the histogram whose shape is closest to the generated histogram or the evaluation result associated with the information on the closest peak position in the generated histogram as the final evaluation result.

Figure 6:
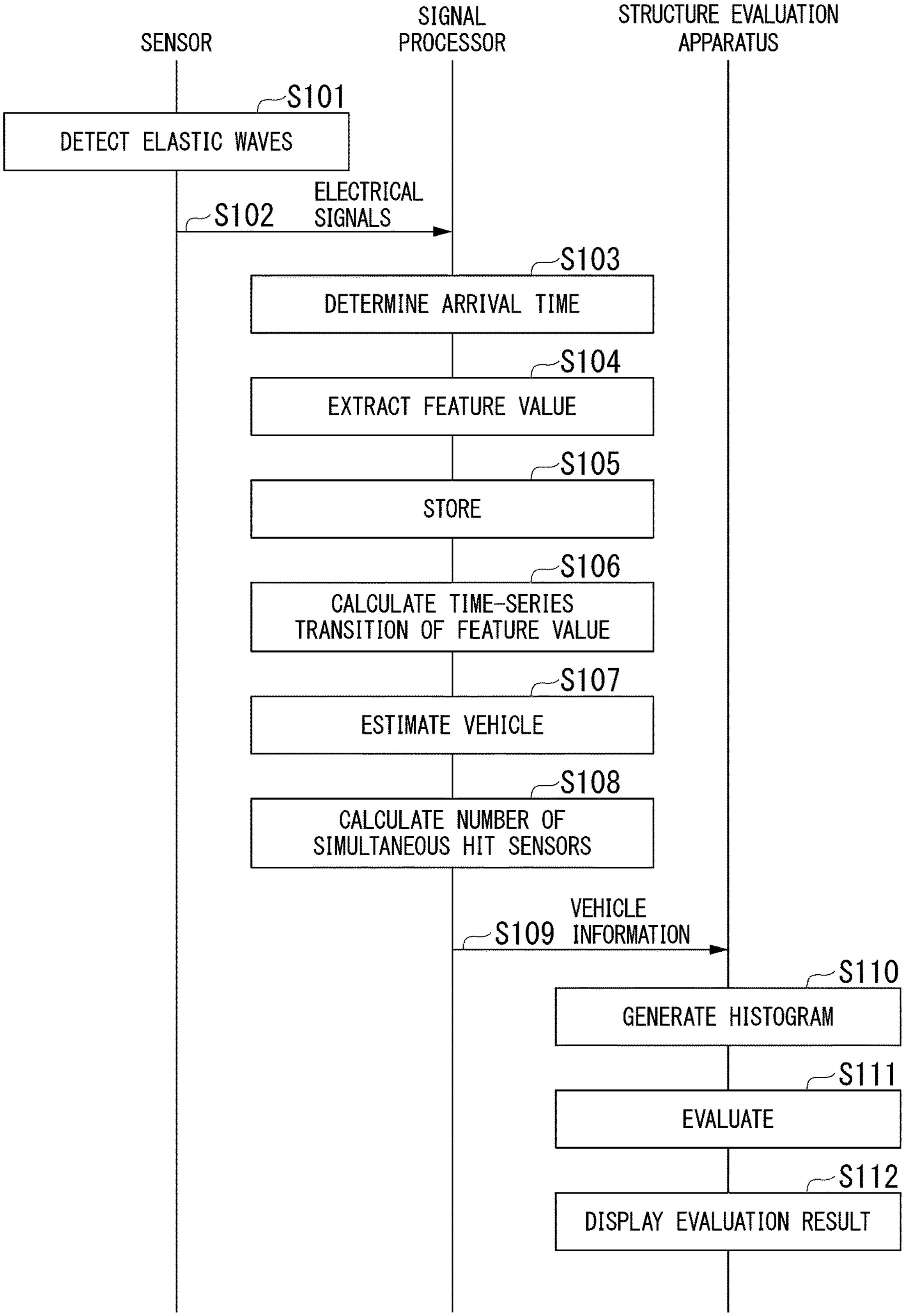
FIG. 6 is a sequence diagram illustrating a flow of processing of evaluating a deterioration state performed by the structure evaluation system according to the first embodiment.

FIG. 6 is a sequence diagram illustrating a flow of processing of evaluating a deterioration state performed by the structure evaluation system 100 according to the first embodiment. The processing in FIG. 6 is executed, for example, in response to the vehicle 10 traveling on the structure 50 which is an evaluation target.

When the vehicle 10 travels on the structure 50 which is an evaluation target, the traveling parts of the vehicle 10 come into contact with the road surface. This causes the elastic waves 11 to be generated within the structure 50. Each of the plurality of sensors 20 detects the elastic waves 11 generated within the structure 50 (step S101). Each of the plurality of sensors 20 converts the detected elastic waves 11 into an electrical signal and outputs it to the signal processor 30 (step S102). The signal processor 30 receives the electrical signal output from each of the plurality of sensors 20. The signal processor 30 performs signal processing such as amplification, conversion into a digital signal, and noise removal on each received electrical signal.

The arrival time determiner 305 determines the arrival time of each digital signal after signal processing (step S103). Specifically, the arrival time determiner 305 determines the elastic wave arrival time using a clock input while the first gate signal is being input. The arrival time determiner 305 outputs the determined elastic wave arrival time as time information to the data recorder 307. The arrival time determiner 305 performs this process on all input digital signals.

The feature value extractor 306 of the signal processor 30 extracts the feature values of the noise removal signal using the noise removal signal which is a digital signal input while the first gate signal is being input (step S104). The feature value extractor 306 outputs parameters related to the extracted feature values to the data recorder 307. The data recorder 307 stores elastic wave data including the sensor ID, time information, and parameters related to the feature values in the memory 308 (step S105).

The vehicle number estimator 309 calculates the time-series transition of the feature values using one or more pieces of elastic wave data stored in the memory 308 (step S106). One piece of elastic wave data includes parameters related to the feature values of the elastic waves 11 detected by one sensor 20 during a period in which one vehicle 10 passes. Therefore, the vehicle number estimator 309 calculates the time-series transition of the feature values such as the line segments S1 and S2 shown in FIG. 4 for each piece of elastic wave data. The vehicle number estimator 309 executes the process of step S106 for the evaluation target period.

The vehicle number estimator 309 estimates the number of passing vehicles on the basis of the time-series transition of the feature values for the calculated evaluation target period (step S107). Further, the vehicle number estimator 309 calculates the number of simultaneous hit sensors on the basis of the time-series transition of the feature values for the calculated evaluation target period (step S108). The vehicle number estimator 309 transmits information on the estimated number of vehicles and information on the number of simultaneous sensor hits as vehicle information to the structure evaluation apparatus 40 (step S109).

The communicator 41 of the structure evaluation apparatus 40 receives the vehicle information output from the signal processor 30. The acquirer 421 acquires the vehicle information received by the communicator 41. The acquirer 421 records the acquired vehicle information in the storage 43. The evaluator 422 generates a simultaneous hit histogram using the vehicle information for the evaluation target period stored in the storage 43 (step S110). The evaluator 422 evaluates the state of deterioration of the structure using the generated simultaneous hit histogram (step S111). As a method for the evaluator 422 to evaluate the state of deterioration of the structure, there is an evaluation method based on either the distribution shape or the peak position of the simultaneous hit histogram as described above. Hereinafter, each evaluation method will be described in detail with examples.

(Evaluation on the Basis of Distribution Shape of Simultaneous Hit Histogram)

The evaluator 422 evaluates that the structure 50 is sound, for example, in a case where the generated simultaneous hit histogram exhibits a shape indicating soundness (for example, the bathtub shape shown in FIG. 5A). Alternatively, the evaluator 422 compares the shape of the histogram included in the reference information with the generated simultaneous hit histogram, and evaluates that the structure 50 is sound in a case where the shape of the generated histogram is closest to the histogram with which the evaluation result of soundness is associated. Here, the shape of the histogram being closest to the histogram with which the evaluation result of soundness is associated means that the degree of similarity between the shape of the generated histogram and the histogram with which the evaluation result of soundness is associated is highest or the degree of similarity is equal to or greater than a threshold.

On the other hand, the evaluator 422 evaluates that the structure 50 has deteriorated, for example, in a case where the shape of the generated simultaneous hit histogram shows a shape indicating deterioration (for example, a shape shown in FIG. 5B or 5C). Alternatively, the evaluator 422 compares the shape of the histogram included in the reference information with the generated simultaneous hit histogram, and evaluates that the structure 50 has deteriorated in a case where the shape of the generated histogram is closest to the histogram with which the evaluation result of deterioration is associated. Here, the shape of the histogram being closest to the histogram with which the evaluation result of deterioration is associated means that the degree of similarity between the shape of the generated histogram and the histogram with which the evaluation result of deterioration is associated is highest or the degree of similarity is equal to or greater than a threshold.

As described above, the reference information includes a plurality of shapes of the histograms with which the evaluation result is associated. For example, the reference information includes a plurality of shapes of the histograms with which the evaluation result indicating soundness is associated, a plurality of shapes of the histograms with which the evaluation result indicating deterioration is associated, and the like. Meanwhile, the shape of the histogram with which the evaluation result indicating soundness is associated and the shape of the histogram with which the evaluation result indicating deterioration is associated are not limited to one shape, and a plurality of shapes may be included in the reference information. The evaluator 422 calculates the degree of similarity between the shape of each histogram included in the reference information and the generated simultaneous hit histogram. Next, the evaluator 422 selects the shape of a histogram in which the calculate degree of similarity is highest, or equal to or greater than a threshold from among the shapes of the histograms included in the reference information. The evaluator 422 evaluates that the structure 50 is sound in a case where the evaluation result associated with the selected shape of the histogram is soundness, and evaluates that the structure 50 has deteriorated in a case where the evaluation result associated with the selected shape of the histogram is deterioration. Meanwhile, in a case where there are a plurality of selected shapes of histograms, the evaluator 422 may select the one with more evaluation results as the final evaluation result, or may present it to the user for final selection.

(Evaluation on the Basis of Peak Position of Simultaneous Hit Histogram)

The evaluator 422 evaluates that the structure 50 is sound, for example, in a case where the peak position of the number of simultaneous hit sensors in the generated simultaneous hit histogram is a position close to the total number of the plurality of installed sensors 20. Here, a position close to the total number may be a position of the value of the total number, or a position where the difference from the total number is less than a certain value (for example, the difference is "1," "2," or the like). For example, in a case where the total number of the plurality of sensors 20 is "18," a case where the peak position of the number of simultaneous hit sensors is the position of "18," or a case where the peak position of the number of simultaneous hit sensors is position of "16" or "17," the structure 50 is evaluated as to be sound. Meanwhile, the value for determining to be close to the total number is not limited to the above-described value, and may be appropriately set.

Alternatively, the evaluator 422 compares information on the peak position included in the reference information with the peak position of the number of simultaneous hit sensors in the simultaneous hit histogram, and evaluates that the structure 50 is sound in a case where the peak position of the number of simultaneous hit sensors is included in the value indicated by the information on the peak position with which the evaluation result of soundness is associated.

On the other hand, the evaluator 422 evaluates that the structure 50 has deteriorated, for example, in a case where the peak position of the number of simultaneous hit sensors in the generated simultaneous hit histogram is not a position close to the total number of the plurality of installed sensors 20 (that is, in a case where it is a position other than the position close to the total number of the plurality of installed sensors 20). Alternatively, the evaluator 422 compares the information on the peak position included in the reference information with the peak position of the number of simultaneous hit sensors in the simultaneous hit histogram, and evaluates that the structure 50 has deteriorated in a case where the peak position of the number of simultaneous hit sensors is included in the value indicated by the information on the peak position with which the evaluation result deterioration is associated.

The evaluator 422 outputs the evaluation result to the display 44. The display 44 displays the evaluation result output from the evaluator 422 (step S112).

The structure evaluation system 100 configured as described above includes the plurality of sensors 20, the vehicle number estimator 309, and the evaluator 422. The plurality of sensors 20 detect elastic waves generated inside the structure 50. The vehicle number estimator 309 estimates the number of vehicles passing through the structure 50 on the basis of a plurality of elastic waves detected by the plurality of sensors 20. The evaluator 422 evaluates the state of deterioration of the structure 50 using the vehicle information relating to the number of vehicles estimated by the vehicle number estimator 309. This makes it possible to evaluate the state of deterioration of the structure without locating the position of the elastic wave source.

Second Embodiment

In a second embodiment, a configuration in which the estimation result of the number of passing vehicles is compared with a reference value and the state of deterioration of a structure is evaluated on the basis of the closest threshold will be described. The system configuration in the second embodiment and components included in each device are the same as those in the first embodiment. Hereinafter, a description will be given with focus on differences from the first embodiment.

In the simultaneous hit histogram according to the first embodiment, in a case where the number of simultaneous hit sensors is small, there is a high possibility that it is noise rather than elastic waves generated with the passage of the vehicle 10. Therefore, the number of passing vehicles can be estimated more accurately by setting a threshold N for the number of simultaneous hit sensors, regarding estimated vehicles whose number of simultaneous hit sensors is less than the threshold N as noise, and integrating the estimated number of vehicles whose number of simultaneous hit sensors is equal to or greater than the threshold N.

Figure 7A:
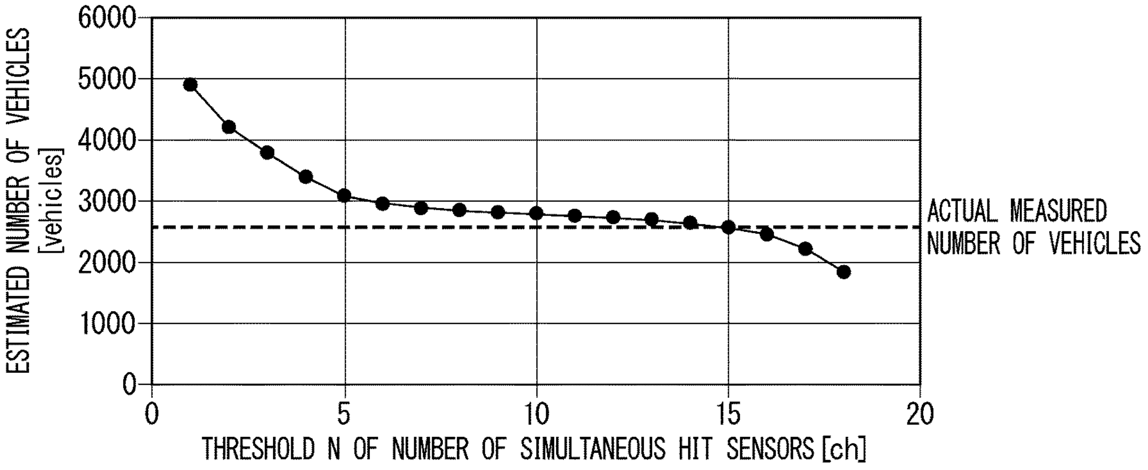
FIG. 7A is a diagram illustrating a histogram of the cumulative number of vehicles which is obtained on the basis of a sound structure.
Figure 7B:
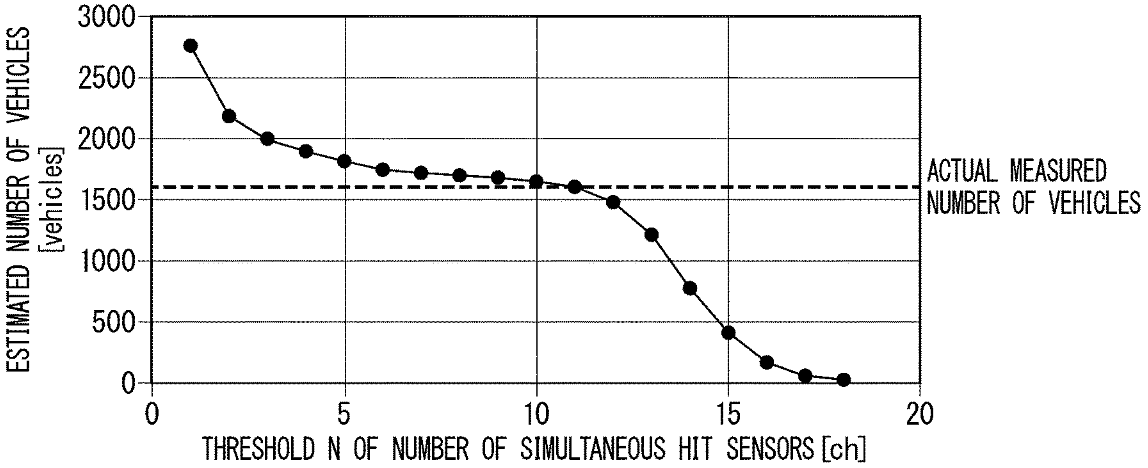
FIG. 7B is a diagram illustrating a histogram of the cumulative number of vehicles which is obtained on the basis of a structure that has deteriorated to some extent.
Figure 7C:
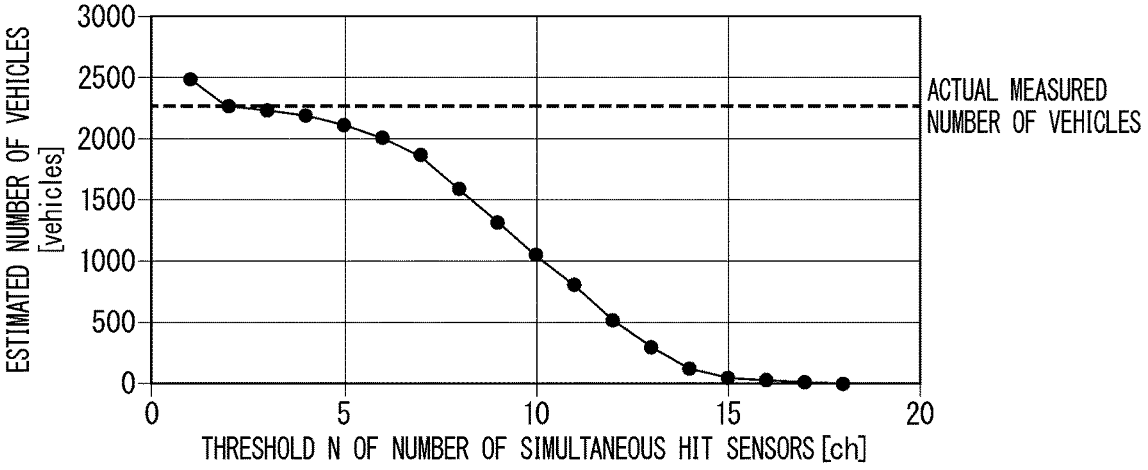
FIG. 7C is a diagram illustrating a histogram of the cumulative number of vehicles which is obtained on the basis of a structure that has deteriorated to some extent.

FIGS. 7A to 7C are diagrams illustrating graphs in which the estimated number of vehicles is plotted against the threshold N of the number of simultaneous hit sensors. FIGS. 7A to 7C are, for example, histograms of the number of vehicles which are the cumulative estimated number of vehicles in which the number of simultaneous hit sensors is equal to or greater than the threshold N in each of FIGS. 5A to 5C. That is, FIG. 7A represents a histogram of the cumulative number of vehicles obtained on the basis of the sound structure 50, and FIGS. 7B and 7C represent histograms of the cumulative number of vehicles obtained on the basis of the structure 50 that has deteriorated to some extent. In the histogram of the cumulative number of vehicles, the horizontal axis represents the threshold N of the number of simultaneous hit sensors, and the vertical axis represents the estimated number of vehicles (in the present embodiment, the number of vehicles which is the cumulative estimated number of vehicles). Therefore, when the threshold N=1, this is a value obtained by counting the number of all estimation vehicles including estimated vehicles and estimates noise, whereas when the threshold N=18, this is a value obtained by counting only the estimated number of vehicles detected by all the sensors 20. By appropriately setting the value of the threshold N for the number of simultaneous hit sensors, the number of vehicles passing through the measurement location can be estimated with a good degree of accuracy.

In a case where the structure 50 is sound, the number of simultaneous hit sensors becomes large, and thus the cumulative number of vehicles becomes close to the actual number of passing vehicles (hereinafter referred to as "the actual measured number of vehicles") even when the threshold N is set to be large. In the example shown in FIG. 7A, the threshold at which the cumulative number of vehicles (the estimated number of vehicles on the vertical axis in FIG. 7A) and the actual measured number of vehicles are closest to each other is 15. On the other hand, in a case where the structure 50 has deteriorated, the number of simultaneous hit sensors becomes small even when the vehicle 10 passes directly above the sensor 20, and thus the threshold N is required to be set to be small in order to obtain the estimated number of vehicles close to the actual measured number of vehicles. In the example shown in FIG. 7B, the threshold at which the cumulative number of vehicles (the estimated number of vehicles on the vertical axis in FIG. 7B) and the actual measured number of vehicles are closest to each other is 11, whereas in the example shown in FIG. 7C, the threshold at which the cumulative number of vehicles (the estimated number of vehicles on the vertical axis in FIG. 7C) and the actual measured number of vehicles are closest to each other is 2. In a case where the threshold N is set to be large, the estimated number of vehicles will be smaller than the actual measured number of vehicles. That is, the optimal value of the threshold N for accurately estimating the number of passing vehicles tends to increase as the structure 50 becomes sounder, and tends to decrease as deterioration has progressed. Therefore, the state of deterioration of the structure 50 can be simply evaluated by evaluating the optimal value of the threshold N.

Specifically, the evaluator 422 first generates a histogram of the cumulative number of vehicles using the generated simultaneous hit histogram as described above. Next, the evaluator 422 uses the generated histogram of the cumulative number of vehicles to determine the estimated number of vehicles having a value closest to the reference value. The evaluator 422 then determines the threshold N at which the determined estimated number of vehicles is obtained. The evaluator 422 evaluates that the structure is sound in a case where the determined threshold N is equal to or greater than a predetermined value. On the other hand, the evaluator 422 evaluates that the structure has deteriorated in a case where the determined threshold N is less than the predetermined value. Meanwhile, in this case, the evaluator 422 may evaluate that deterioration has progressed as the determined threshold N becomes lower (as the threshold N decreases from the predetermined value). That is, the evaluator 422 may evaluate the state of deterioration in stages in accordance with the determined value of the threshold N.

In this way, the threshold N of the number of simultaneous hit sensors can be used as a simple index of the state of deterioration of the structure 50. Examples of the reference value capable of being used include the actual measurement value of a passing vehicle measured using other sensing schemes which are not influenced by the internal damage state of a structure, such as a magnetic sensor or a strain sensor, the actual measurement value of a passing vehicle measured on the basis of weigh-in-motion (WIM), average traffic volume during normal times, an actual measurement value (traffic counter) or a statistical value acquired by a road administrator, or the like.

According to the structure evaluation system 100 in the second embodiment configured as described above, the reference value and the estimated number of vehicles are compared with each other to determine the estimated number of vehicles closest to the reference value and to determine the threshold N of the number of simultaneous hit sensors at which the determined estimated number of vehicles is obtained. The evaluator 422 then evaluates the state of deterioration of the structure 50 in accordance with the determined threshold N of the number of simultaneous hit sensors. This makes it possible to evaluate the state of deterioration of the structure 50 using a simple method without locating the position of the elastic wave source. Further, as described above, it can be considered that deterioration has progressed as the threshold N of the number of simultaneous hit sensors becomes lower. Therefore, the evaluator 422 can evaluate the degree of deterioration in stages in accordance with the determined threshold N of the number of simultaneous hit sensors.

Third Embodiment

In a third embodiment, a configuration in which the estimated number of vehicles estimated by the vehicle number estimator and the reference value are compared with each other to evaluate the state of deterioration of a structure in accordance with the degree of deviation will be described. The system configuration in the third embodiment and components included in each device are the same as those in the first embodiment. Hereinafter, a description will be given with focus on differences from the first embodiment.

The number of simultaneous hit sensors decreases as the deterioration of the structure 50 has progressed. For this reason, the number of vehicles simultaneously detected by a large number of sensors 20 decreases as the deterioration of the structure 50 has progressed. As a result, in a case where the value of the threshold N of the number of simultaneous hit sensors becomes larger as the deterioration of the structure 50 has progressed, the deviation between the actual measured number of vehicles and the estimated number of vehicles estimated by the vehicle number estimator 309 becomes larger. Under this assumption, in a case where the number of vehicles is estimated by fixing the threshold N of the number of simultaneous hit sensors to a larger value such as "15," for example, than the total number of sensors 20 of "18," the state of deterioration of the structure 50 can be simply evaluated by comparing the estimated number of vehicles with the actual measured number of vehicles. Specifically, the evaluator 422 evaluates that the deterioration of the structure 50 has progressed as the estimated number of vehicles becomes smaller than the actual measured number of vehicles. That is, the evaluator 422 evaluates that the deterioration of the structure 50 has progressed as the degree of deviation between the actual measured number of vehicles and the estimated number of vehicles becomes larger. That is, the evaluator 422 may evaluate the state of deterioration in stages in accordance with the degree of deviation. Meanwhile, the evaluator 422 may evaluate that the structure 50 has not deteriorated or is sound in a case where the difference between the actual measured number of vehicles and the estimated number of vehicles is smaller than a certain threshold.

Here, the actual measured number of vehicles is acquired as a reference value using the method shown in the second embodiment. The threshold N of the number of simultaneous hit sensors is appropriately set by a user. Meanwhile, as described above, it is assumed that as the value of the threshold N of the number of simultaneous hit sensors becomes larger, the deviation between the actual measured number of vehicles and the estimated number of vehicles estimated by the vehicle number estimator 309 becomes larger. Therefore, a higher value of the threshold N of the number of simultaneous hit sensors is preferable.

According to the structure evaluation system 100 in the third embodiment configured as described above, the state of deterioration of the structure 50 is simply evaluated in accordance with the degree of deviation between the actual measured number of vehicles and the estimated number of vehicles. This makes it possible to evaluate the state of deterioration of the structure 50 using a simple method without locating the position of the elastic wave source. Further, as described above, it can be considered that deterioration has progressed as the degree of deviation between the actual measured number of vehicles and the estimated number of vehicles becomes larger. Therefore, the evaluator 422 can evaluate the degree of deterioration in stages in accordance with the degree of deviation between the actual measured number of vehicles and the estimated number of vehicles.

Modification Example 1 Common to Each Embodiment

In each of the above embodiments, a configuration in which the plurality of sensors 20-1 to 20-*n* are connected to one signal processor 30 is shown. The structure evaluation system 100 may include a plurality of signal processors 30 and each of the sensors 20 may be connected to a different signal processor 30.

Modification Example 2 Common to Each Embodiment

Some or all of the functional units included in the structure evaluation apparatus 40 may be included in another device. For example, the display 44 included in the structure evaluation apparatus 40 may be included in another device. In this configuration, the structure evaluation apparatus 40 transmits the evaluation result to another device including the display 44. The other device including the display 44 displays the received evaluation result.

Modification Example 3 Common to Each Embodiment

In any of the above-described methods, it is necessary to consider the vehicle travel position relative to the sensor position in order to improve the accuracy of evaluation. For example, in a case where the vehicle traffic position and the range of measurement performed by the sensor 20 are separated from each other by a certain distance or more in a direction orthogonal to the vehicle travel axis, the evaluator 422 shifts the histogram of the number of simultaneous hit sensors or the graph of the estimated number of vehicles with respect to the threshold N of the number of simultaneous hit sensors to the side where the number of simultaneous hit sensors becomes smaller overall with increasing distance. This causes the evaluator 422 to change the evaluation standard on the basis of the relative positional relationship between the sensor installation position and the vehicle passing position. For this reason, as the positional relationship between the vehicle traffic position and the sensor installation position becomes more distant, correction is needed to shift the soundness evaluation standard toward the deterioration side.

Modification Example 4 Common to Each Embodiment

In a case where the deterioration of the structure 50 which is an evaluation target has progressed and there is a tendency for the number of simultaneous hit sensors to be small, a case where undetected vehicles are unevenly distributed among the sensors 20 disposed at specific positions can be considered. In this case, there is a high possibility of localized damage existing between the vehicle traffic position and the installation positions of the sensors 20 where undetected hits are unevenly distributed. Therefore, in a case where the sensors 20 that do not detect a vehicle are concentrated in a specific sensor 20, the evaluator 422 can estimate the position of damage inside the structure 50. For example, in a case where a group of sensors is disposed one-dimensionally along the average vehicle traffic position at a certain distance from the traffic position, the evaluator 422 can specify the position of damage along the traffic position on the basis of a change and difference in vehicle detection state of each sensor. In this way, in a case where there is a sensor 20 that detects a relatively small number of passing vehicles among the plurality of installed sensors 20, the evaluator 422 may determine that a region around the installation position of the sensor where the number of passing vehicles is relatively small is a region where deterioration has occurred. Here, the sensor 20 where the number of passing vehicles is relatively small is a sensor where the number of vehicles detected by another sensor 20 is smaller than a threshold or more.

According to at least one embodiment described above, the structure evaluation system 100 of the embodiment includes a plurality of sensors 20, a vehicle number estimator 309, and an evaluator 422. The plurality of sensors 20 detect elastic waves generated inside a structure 50. The vehicle number estimator 309 estimates the number of vehicles passing through the structure 50 on the basis of the plurality of elastic waves detected by each of the plurality of sensors 20. The evaluator 422 evaluates the state of deterioration of the structure 50 using vehicle information relating to the number of vehicles estimated by the vehicle number estimator 309, whereby it is possible to evaluate the state of deterioration of the structure without locating the position of an elastic wave source.

Some of the processing performed by the signal processor 30 in the embodiment described above (for example, the processing performed by the vehicle number estimator 309) may be realized by a computer. In that case, this function may be realized by recording a program for realizing the function in a computer-readable recording medium, and causing a computer system to read and execute the program recorded in this recording medium. Meanwhile, the "computer system" referred to herein includes an OS and hardware such as peripheral equipment. In addition, the "computer-readable recording medium" refers to a portable medium such as a flexible disk, a magneto-optical disk, a ROM, or a CD-ROM or a storage device such as a hard disk that is built into the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. In addition, the foregoing program may be for implementing some of the functions described above, may be implemented in a combination of the functions described above and a program already recorded in a computer system, or may be implemented with a programmable logic device such as an FPGA.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:

a plurality of sensors configured to detect elastic waves generated inside a structure;

a signal processor configured to estimate a number of sensors that have detected elastic waves generated by passing through a same vehicle on a road surface of the structure as a number of simultaneous hit sensors for the evaluation target period on the basis of a plurality of elastic waves detected by each of the plurality of sensors; and a controller comprising a processor and a memory, the controller being configured to: evaluate a state of deterioration of the structure on the basis of the number of simultaneous hit sensors during the evaluation target period estimated by the signal processor.

2. The structure evaluation system according to claim 1, wherein the controller evaluates the state of deterioration of the structure on the basis of a distribution shape or a peak position of a histogram with respect to the number of simultaneous hit sensors.

3. The structure evaluation system according to claim 2, wherein the controller evaluates that the structure is sound in a case where the distribution shape of the histogram is a shape in which a number of times N (where N is an integer greater than or equal to 1) sensors detected elastic waves generated by the passage of the same vehicle is greatest at a position where the number of simultaneous hit sensors is close to the total number of the plurality of sensors or in a case where the peak position of the histogram is a position where the number of simultaneous hit sensors is close to the total number of the plurality of sensors, and evaluates that the structure is deteriorated in other cases.

4. The structure evaluation system according to claim 1, wherein the signal processor uses the number of simultaneous hit sensors for the evaluation target period to count, for every integer N (where N is an integer greater than or equal to 1) up to a total number of sensors, the number of times N sensors detected elastic waves generated by passing through a same vehicle, and generates a histogram, wherein the histogram being a distribution in which the cumulative sum of the measured counts, taken for each integer N or greater, is used as the frequency for every integer N, and the controller evaluates the deterioration status of the structure based on the integer value N that is closest to the reference value, by comparing the multiple accumulated values in the generated histogram with the reference value.

5. The structure evaluation system according to claim 1, wherein the controller compares estimation result by the signal processor with a reference value, and evaluates the state of deterioration of the structure in accordance with a degree of deviation.

6. The structure evaluation system according to claim 5, wherein the reference value is either the estimated number of vehicles measured using a magnetic sensor, a statistical average traffic volume during normal times, a value obtained by a traffic counter, or an actual value of the number of passing vehicles.

7. The structure evaluation system according to claim 1, wherein the controller changes an evaluation standard on the basis of a relative positional relationship between a sensor installation position and a vehicle passing position.

8. The structure evaluation system according to claim 1, wherein the controller determines a region around the installation position of a sensor that detects a relatively small number of passing vehicles among the plurality of sensors where the number of passing vehicles is relatively small as a region where deterioration has occurred.

9. A structure evaluation method comprising:

estimating a number of sensors that have detected elastic waves generated by passing through a same vehicle on a road surface of the structure as a number of simultaneous hit sensors for the evaluation target period on the basis of a plurality of elastic waves detected by each of a plurality of sensors that detect elastic waves generated inside the structure; and evaluating a state of deterioration of the structure on the basis of the number of simultaneous hit sensors during the evaluation target period estimated.

10. A structure evaluation apparatus comprising:

a controller comprising a processor and a memory, the controller being configured to:

a signal processor configured to estimate a number of sensors that have detected elastic waves generated by passing through a same vehicle on a road surface of a structure as a number of simultaneous hit sensors for the evaluation target period on the basis of a plurality of elastic waves detected by each of a plurality of sensors that detect elastic waves generated inside the structure; and a controller comprising a processor and a memory, the controller being configured to: evaluate a state of deterioration of the structure on the basis of the number of simultaneous hit sensors during the evaluation target period estimated.

* * * * *